United States Patent [19]
Tanaka et al.

[11] Patent Number: 5,860,487
[45] Date of Patent: Jan. 19, 1999

[54] ELECTRICALLY ASSISTED VEHICLE

[75] Inventors: Tatsuaki Tanaka, Kasai; Toshihiro Suhara, Taka-gun; Toshihiro Matsumoto, Nishiwaki; Hiroaki Sagara; Yoshihiko Maeda, both of Kasai, all of Japan

[73] Assignee: Sanyo Electric Co., Ltd., Japan

[21] Appl. No.: 741,538

[22] Filed: Oct. 31, 1996

[30] Foreign Application Priority Data

Oct. 31, 1995 [JP] Japan .................................. 7-284078

[51] Int. Cl.⁶ .................................................. B62K 11/00
[52] U.S. Cl. .................................... 180/206; 180/220
[58] Field of Search .................................. 180/205, 206, 180/207, 220, 65.2

[56] References Cited

U.S. PATENT DOCUMENTS

| | | | |
|---|---|---|---|
| 4,221,275 | 9/1980 | Pennebaker et al. | 180/220 |
| 5,024,286 | 6/1991 | Lean et al. | 180/206 |
| 5,370,200 | 12/1994 | Takata | 180/206 |
| 5,375,676 | 12/1994 | Takata et al. | 180/206 |
| 5,474,148 | 12/1995 | Takata | 180/206 |
| 5,505,277 | 4/1996 | Suganuma et al. | 180/206 |

FOREIGN PATENT DOCUMENTS

| | | |
|---|---|---|
| A0590674 | 4/1994 | European Pat. Off. . |
| A0650887 | 5/1995 | European Pat. Off. . |
| A0675037 | 10/1995 | European Pat. Off. . |
| 1559822 | 1/1980 | United Kingdom ................ 180/206 |
| A9632314 | 10/1996 | WIPO . |

*Primary Examiner*—Kevin Hurley
*Attorney, Agent, or Firm*—Morrison Law Firm

[57] ABSTRACT

An electrically assisted vehicle includes a vehicle main body having a driving wheel, a human drive system having a driving force applying part to which a human driving force for driving the driving wheel is applied and a torque detecting part for detecting the human driving force applied to the driving force applying part, and an electric drive system having a motor, a control part for controlling the motor and a battery for power supply, wherein the motor has an electric driving force characteristic such that it outputs the electric driving force only at speeds lower than a predetermined speed, and the control part of the electric drive system controls the motor with a predetermined ratio on the basis of detection results from the torque detecting part of the human drive systems thereby executing power assistance control while maintaining the assist ratio to be less than a predetermined value without providing a speed sensor for carrying out control based on the speed.

13 Claims, 12 Drawing Sheets

ELECTRICALLY ASSISTED VEHICLE

BACKGROUND OF THE INVENTION

1. Field of the Invention

This invention relates to an electrically assisted vehicle such as an electrically assisted bicycle or wheelchair having a human drive system for driving a driving wheel by applying a human driving force and an electric drive system for auxiliarily driving the driving wheel by driving an electric motor in correspondence with the human driving force.

2. Description of the Related Art

Generally known electrically assisted vehicles of this kind include vehicles which reduce the amount of human driving force needed to drive them by supplementing the human driving force with an electric driving force from an electric motor.

In such electrically assisted vehicles, safety during high speed traveling has been ensured by controlling an assist ratio as shown in FIG. 7, for example. That is, a kind of control has been carried out which sets the ratio of the electric driving force to the human driving force, or so-called assist ratio, to be 1.0 at traveling speeds of 0 to 15 km/h, varies it so that it gradually decreases linearly from 1.0 to 0 with speed increase between 15 and 24 km/h and sets it to be 0 at 24 km/h and over, thereby stopping the auxiliary drive provided by the electric driving force.

To achieve this, normally, a method has been adopted wherein a driving force sensor for detecting the amount of the human driving force applied to the driving wheel, a speed sensor for detecting the traveling speed and a microcomputer for calculating how large the electric driving force is to be made are provided, and the amount of the human driving force and the traveling speed are inputted in the microcomputer which is allowed to vary the assist ratio on the basis of table data stocked therein.

For example, supposing that a human driving force of 100 kg·cm is acting on the driving force sensor, an auxiliary additional output provided by the electric driving force is set to be 100 kg·cm when a traveling speed is 10 km/h (see FIG. 7), while it is calculated and outputted to be 44 kg·cm for a traveling speed of 20 km/h because the assist ratio must be reduced to about 0.44.

However, with the kind of construction described above, it has happened that when the speed sensor is inaccurate or the speed sensor malfunctions, the speed reported by the speed sensor and the actual traveling speed are sometimes different, so that, although normal calculation is carried out in the microcomputer, the assist ratio goes outside the limit of control shown in FIG. 7. Thus, it may sometimes become a dangerous travel or result in an insufficiency of electric driving force assistance.

Also, because the speed sensor detects the traveling speed from a wheel or the like which is a rotating part, there has been a problem that wiring is necessary and the construction is liable to become complicated and the wiring is liable to constitute an obstruction.

SUMMARY OF THE INVENTION

This invention was made in view of the problems described above, and an object of the invention is to provide an electrically assisted vehicle which has a simple construction, the safety of which is high during traveling and which can provide ample electric driving force assistance (auxiliary drive).

To achieve this object and other objects, the invention provides an electrically assisted vehicle comprising: a vehicle main body having a driving wheel driven by human power and electric power; a human drive system having a driving force applying part to which a human driving force for driving the driving wheel is applied and a torque detecting part for detecting the human driving force applied to this driving force applying part; and an electric drive system having a motor for outputting an electric driving force for driving the driving wheel, a control part for controlling the motor and a battery for power supply, wherein the motor of the electric drive system has an electric driving force characteristic such that the motor outputs the electric driving force only at speeds lower than a predetermined speed, and the control part of the electric drive system controls the motor with a predetermined ratio on the basis of detection results from the torque detecting part of the human drive system.

With this kind of construction, it is possible for the control part to control the electric drive system with a predetermined ratio on the basis of detection results from the torque detecting part of the human drive system. Therefore, it is possible to control the electric drive system while maintaining the assist ratio (ratio of the electric driving force to the human driving force) to be less than a predetermined value without providing a speed sensor for carrying out control based on the speed as in the related art, and it is possible to provide power assistance while maintaining safety. In this specification and in the claims, 'torque' refers to the amount or strength of a driving force.

DETAILED DESCRIPTION OF THE PREFERRED EMBODIMENTS

Figure 1:
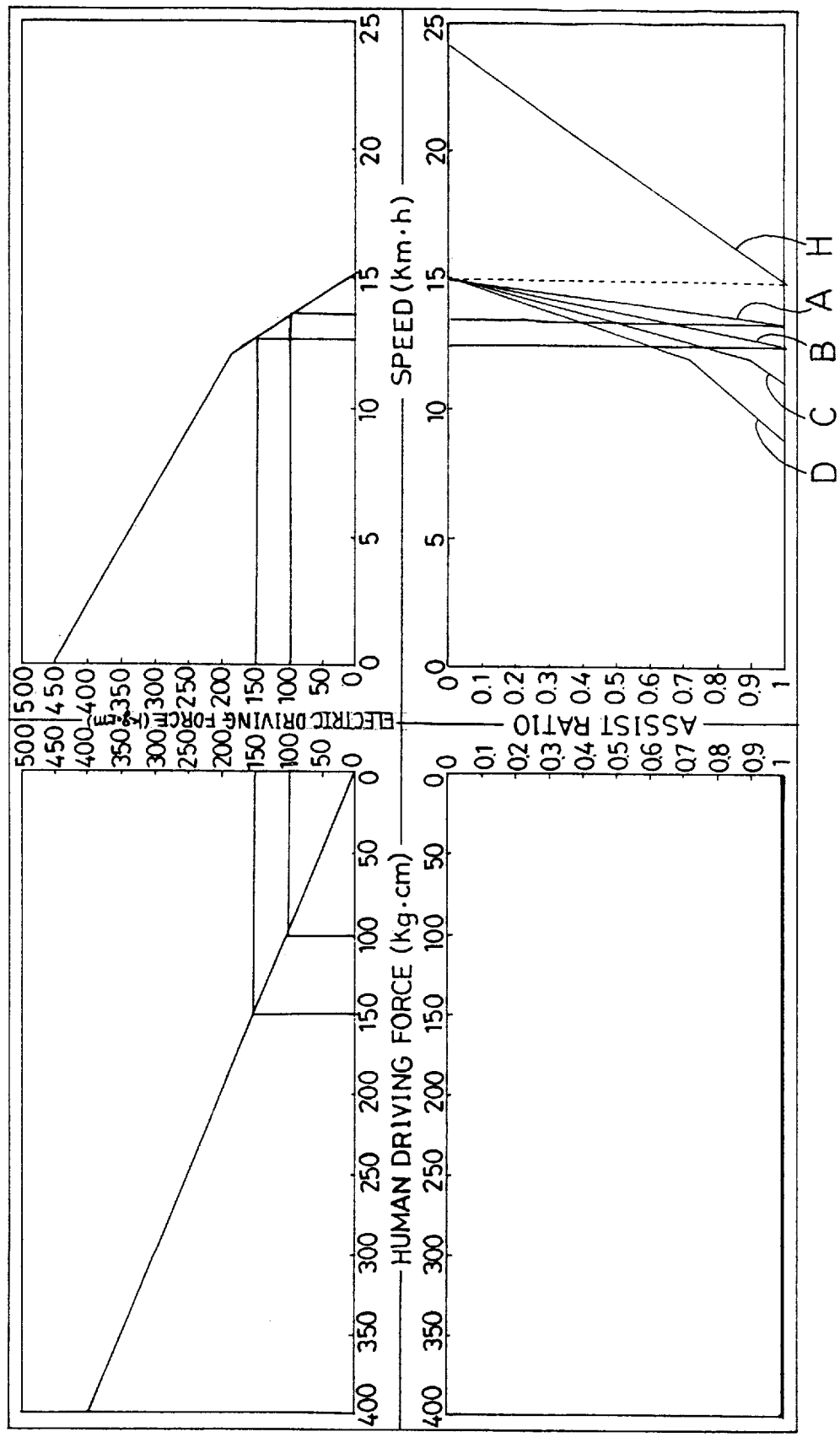
FIG. 1 is a set of graphs showing actual output torque assist ratio obtained from set assist ratio and electric drive system driving force characteristics of a first preferred embodiment of the invention.

In an electrically assisted vehicle according to the present invention, it is preferable to use an electric drive system having an electric driving force characteristic such that the electric drive system outputs no auxiliary driving force if the speed exceeds a first predetermined speed (for example 24 km/h) determined as a lower limit value of a dangerous traveling speed range. With this kind of construction, irrespective of the actual traveling speed, even when the ratio of the electric driving force to the human driving force is controlled to be 1:1, no motor output is made if the speed exceeds the first predetermined speed at which power assistance must be stopped.

Further, it is preferable to use an electric drive system having an electric driving force characteristic such that the electric drive system outputs no auxiliary driving force if the speed exceeds a second predetermined speed (for example 15 km/h) determined as an upper limit value of a safe traveling speed range. With this kind of construction, the electric driving force provided by the electric drive system is only outputted at speeds below the second predetermined speed at which, for example, power assistance must start to be reduced. Therefore, it is possible to execute control while maintaining the assist ratio to be less than a predetermined value without providing a speed sensor for carrying out control based on speed, and it is possible to provide power assistance while maintaining safety.

When the electric drive system is used having an electric driving force characteristic of outputting no auxiliary driving force if the speed exceeds a first predetermined speed or a second predetermined speed in an electrically assisted vehicle according to the invention, the control part preferably stores such electric driving force characteristic in advance and preferably calculates an output torque of the motor with reference to these characteristics.

In the electrically assisted vehicle according to the invention, the assist ratio is preferably in the range from 0 to 1. In this case, except when the assist ratio is 0, the control part operates the motor of the electric drive system in correspondence with the amount of the human driving force detected by a driving force detecting part of the human drive system and the vehicle travels by two driving forces, namely the human driving force and the electric driving force added auxiliarily thereto at a fixed ratio in the range from 0 to 1.

The assist ratio preferably changes in the range from 0 to 1 linearly (as expressed with a first-order function) or curvilinearly (as expressed with a second-order or third-order function) until the human driving force reaches a predetermined value (for example 200 kg·cm) and is kept constant above this predetermined value.

Here, if according to the driving force characteristic of the electric drive system the assist ratio when a small human driving force is acting on the driving wheel is changed, for example reduced, in a part where the assist ratio is gradually decreased from 1 to 0 in a caution traveling speed range (for example 15 to 24 km/h) determined as a range of speeds lower than the dangerous traveling speed range, a safe range is not exceeded.

In the construction described above, if the assist ratio is so set that it is gradually increased within a fixed range as the human driving force becomes large, a safe range is not exceeded at high speeds even if the actual traveling speed is not detected. Also, it is possible to suppress consumption of the power supply battery at low human driving forces at which the assistance of an electric driving force is not required so much.

Also, if the assist ratio is so set that its rate of change is increased as the human driving force increases, it is possible to provide small electric driving force in the case of small human driving force and large electric driving force in the case of large human driving force. In this way, it is possible to suppress excess battery consumption and provide assistance with large electric driving forces within a safe range.

The safe traveling speed range is a speed range determined as the range of speeds lower than the caution traveling speed range mentioned above.

A first preferred embodiment of the invention applied to an electrically assisted bicycle will now be described in detail on the basis of FIG. 1 through FIG. 6.

First, the overall construction of the electrically assisted bicycle will be described on the basis of FIG. 6.

Figure 6:
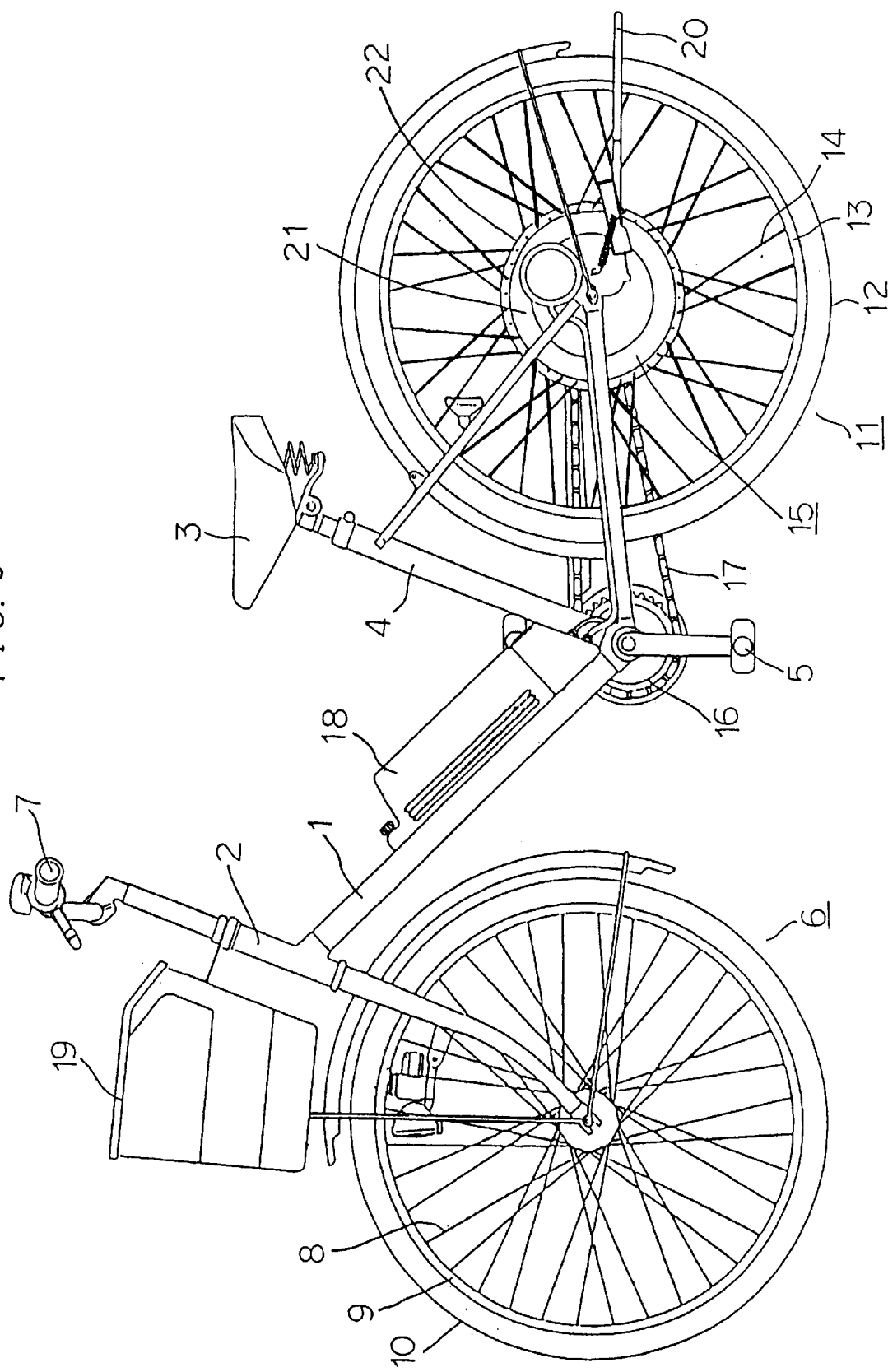
FIG. 6 is an overall construction view of the first preferred embodiment.
Figure 7:
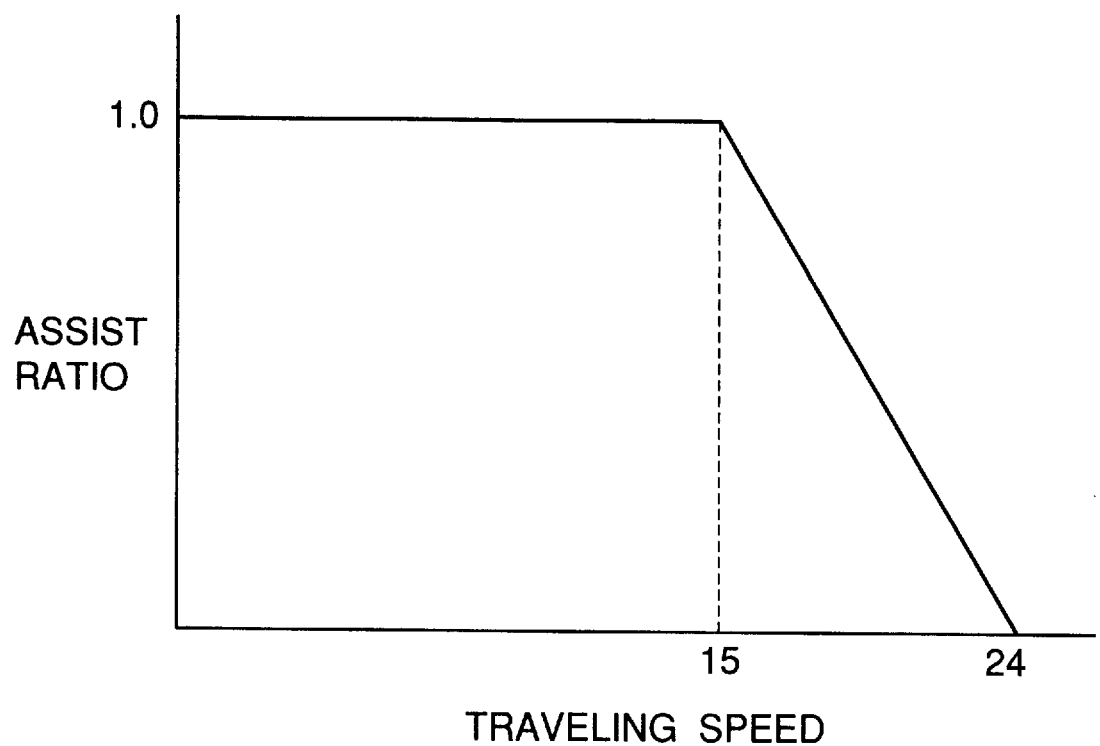
FIG. 7 is a graph showing a relationship between assist ratio and speed for ensuring safety.

In FIG. 6, the reference numeral 1 denotes a main frame connected to a head pipe 2 disposed at the front and a seat pipe 4 disposed below a saddle 3. Pedals 5 as a driving force applying part which can be rotated by a rider are mounted on the main frame 1 at a portion where the main frame 1 is connected to the seat pipe 4.

The reference numeral 6 denotes a front wheel which moves together with handlebars 7 and determines the direction of travel according to turning of the handlebars 7. The front wheel 6 is made up of spokes 8, a rim 9 and a tire 10.

The reference numeral 11 denotes a rear wheel which is a driving wheel, and this rear wheel 11 is made up of a tire 12, a rim 13, spokes 14 and a driving part 15.

The reference numeral 16 denotes a front sprocket which rotates together with rotation of the pedals 5. A chain 17 is set on the front sprocket 16 and transmits rotation of the front sprocket 16 to a rear sprocket 27 (shown in FIG. 3) mounted on an axle of the driving part 15.

The reference numeral 18 denotes a battery constituting a power supply of a motor 49 which will be further discussed later, and houses a 24-volt nickel cadmium battery. The battery 18 is removable and can be recharged indoors.

The reference numeral 19 denotes a front basket and 20 a stand for supporting the bicycle when parked.

Figure 3:
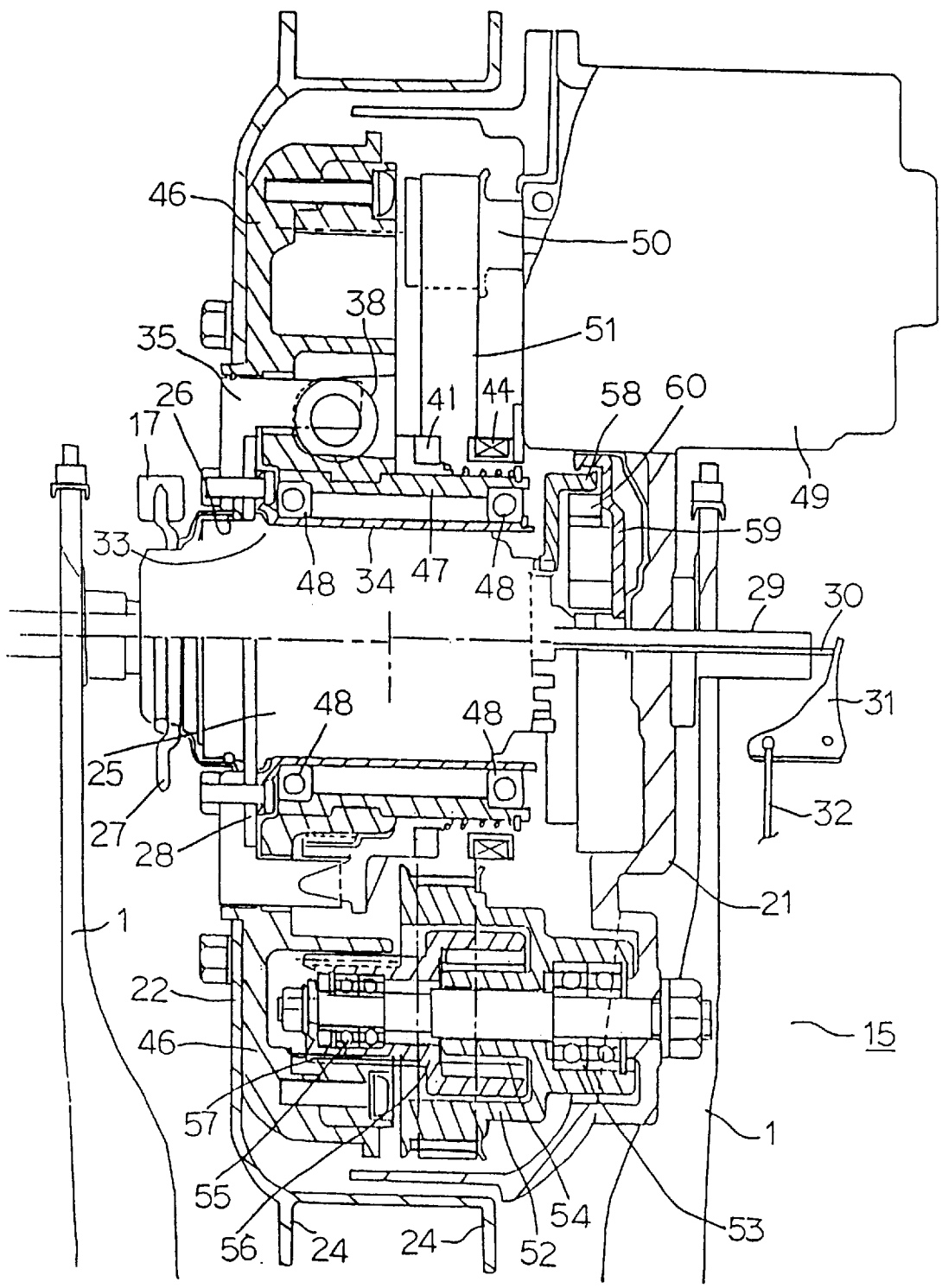
FIG. 3 is a sectional view on the line A—A in FIG. 4 of a driving part of the first preferred embodiment.
Figure 4:
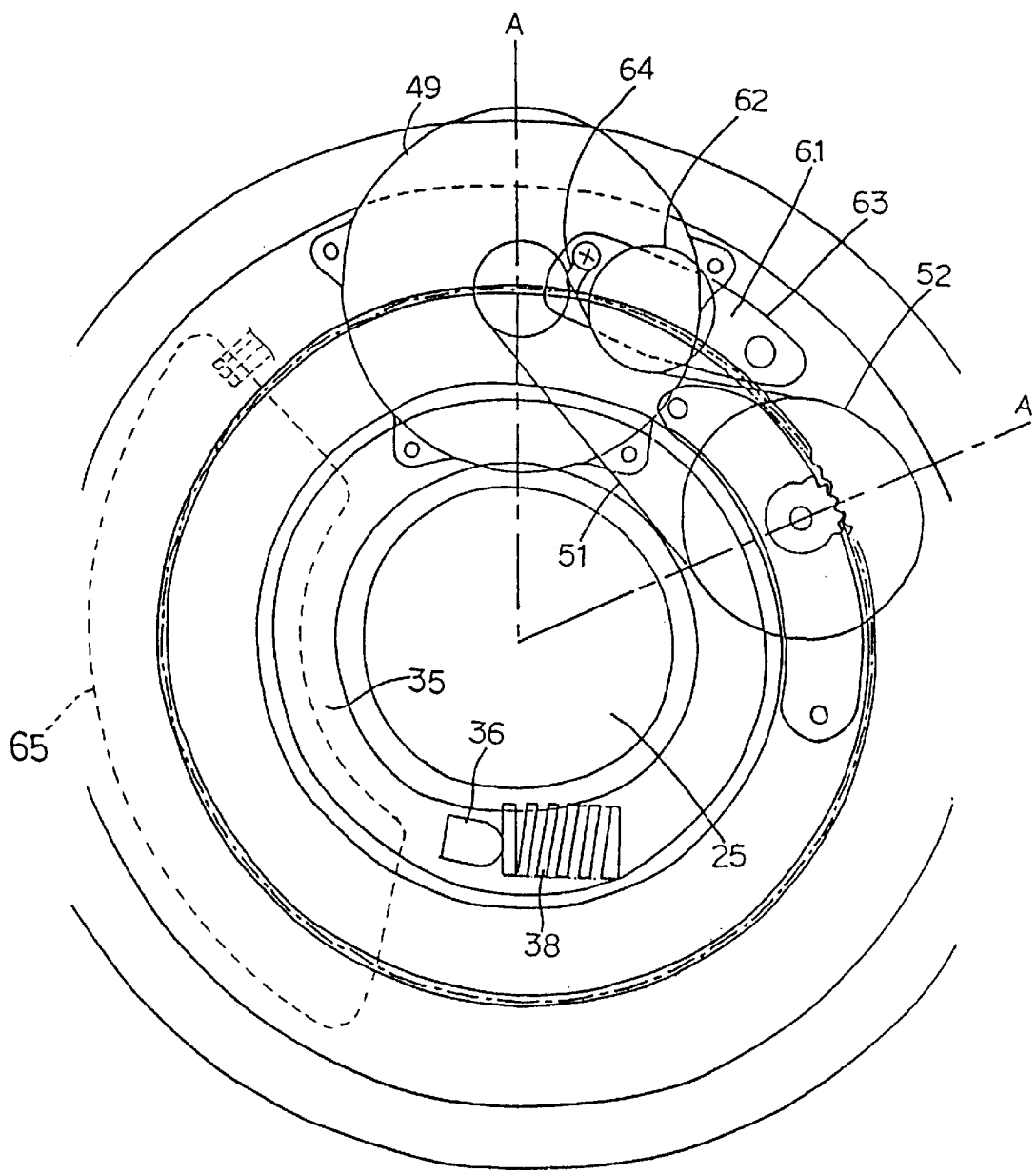
FIG. 4 is a plan view of the construction of this driving part.

The specific construction of the above-mentioned driving part 15 is shown in FIG. 3 and FIG. 4.

The reference numeral 21 denotes a disc-shaped fixed side casing fixed to the main frame 1, and the reference numeral 22 denotes a rotating side casing which is coaxial with the fixed side casing 21 and rotates on the outer side of the fixed side casing 21. The fixed side casing 21 and the rotating side casing 22 together constitute a hub. Two annular ribs 24 are formed around the periphery of the rotating side casing 22, and the spokes 14 are disposed extending in tension from these annular ribs 24 to the rim 13, on which the tire 12 is fitted.

The reference numeral 25 denotes an in-hub-spindle type gearbox disposed on the axle, and this gearbox 25 is connected to the rear sprocket 27 through a ratchet 26. That is, due to the ratchet 26, the human force from the chain 17 acts only in one direction. When a force acts in the direction of reverse rotation, the driving force is cut off. The gearbox 25 is housed inside a cylindrical container 33. A flange part 28 is formed around the entire periphery of one side of the container 33. A gear change rod 30 is slidably inserted into this gearbox 25 through a hollow part of the axle 29 and is urged toward the outside. By the gear change rod 30 being moved to the left or to the right, gears (not shown) inside the gearbox 25 are changed over. A pushing piece 31 for pushing the gear change rod 30 is disposed in pressing contact with the gear change rod 30, and an operating lever (not shown) for operating the pushing piece 31 is disposed in the vicinity of the handlebars 7 and connected to the pushing piece 31 by a wire 32. When the wire 32 is pulled by means of the operating lever, the pushing piece 31 pivots and moves the gear change rod 30 and the gear changes.

A sleeve 34 is press-fitted onto the container 33 of the gearbox 25 and surrounds the outer periphery of the container 33. The sleeve 34 is screw-fastened to the flange part 28.

The reference numeral 35 denotes a turning plate which rotates integrally with the sleeve 34 and the flange part 28. The turning plate 35 will now be described with reference to FIG. 5, which is a schematic illustration of its operation.

The turning plate 35 is larger than the diameter of the outer peripheral of the container 33 of the gearbox 25 and is circular and concentric with the gearbox 25. A pushing rod 36 and a converting rod 37 extending in the axial direction are provided integrally with the turning plate 35 in two facing locations. The pushing rod 36 is formed in the shape of a prism with a bell-shaped surface, and, with a bell-shaped curved surface portion, pushes an elastic body, namely a spring 38. The turning plate 35 turns along the outer periphery of the gearbox 25 concentrically with the gearbox 25 with the outer periphery of the container 33 serving as a guide while compressing the spring 38. The converting rod 37 has a rectangular parallelopiped shape extending in the direction of the axle 29, and an end portion thereof forms a sloping face so that it becomes shorter with progress in the direction of rotation.

The other end of the spring 38 pushed by the pushing rod 36 makes contact with a part of the rotating side casing 22. The order of transmission of the human driving force is such that the turning plate 35 by means of the pushing rod 36 compresses the spring 38 and rotates the rotating side casing 22. At this time, in correspondence with the amount of compression of the compressed spring 38, the turning plate 35 turns while causing slight strain with respect to the rotating side casing 22. This turning plate 35 turns around the gearbox 25 in correspondence with the strain caused by the human driving force. At this time, the converting rod 37 also turns similarly as a result of the slight turning of the turning plate 35, and a mountain-shaped member 40 in contact with the sloping part 39 formed at the end of the converting rod 37 is pushed and moved in the direction of the axle 29 by the sloping part 39. A magnetic member, namely a ferrite ring 41, is attached to this mountain-shaped member 40. When the mountain-shaped member 40 moves, the ferrite ring 41 also moves. A C-ring 42 and a spring 43 for urging the ferrite ring 41 toward the turning plate 35 side are mounted on the end of this ferrite ring 41. As a result, the ferrite ring 41 moves in the direction of the axle 29 by an amount corresponding to the strain of the turning plate 35 with respect to the rotating side casing 22.

A coil 44 is mounted on the fixed side casing 21 in the vicinity of the ferrite ring 41. The coil 44 can convert changes in inductance caused by the approach of the ferrite ring 41 into an electrical signal. Using an output from this signal, it is possible to detect the human power torque (the force rotating the pedals 5).

Figure 5:
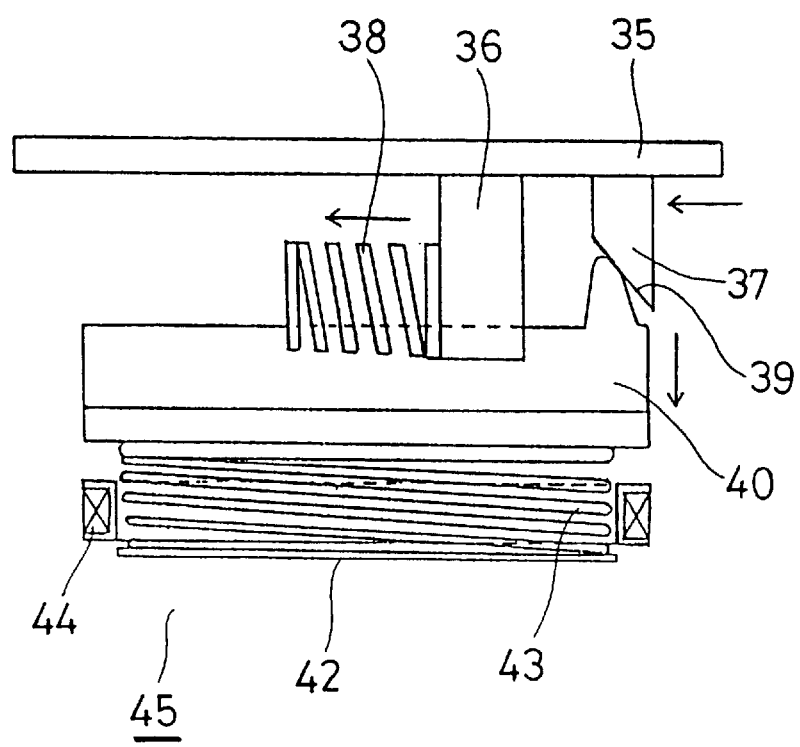
FIG. 5 is a schematic view illustrating the operation of a driving force detecting part of the first preferred embodiment.

The members shown in FIG. 5 are together called a driving force detecting part 45. Also, here the converting rod 37, the mountain-shaped member 40, the ferrite ring 41 and the magnetic detecting member 44 are together called a detecting part, and by means of these it is possible to detect the degree of compression of the spring 38 constituting the elastic body. Also, the converting rod 37 and the mountain-shaped member 40 are together called a converting member, and this converting member converts compression of the spring 38 in the rotation direction into movement in the direction of the axle 29.

In this kind of bicycle, the pedals 5, the front sprocket 16, the chain 17, the rear sprocket 27, the gearbox 25, the ratchet 26 and the driving force detecting part 45 are collectively called the human drive system.

In the construction described above, a magnetic ferrite ring 41 was used as the ring, but the ring may alternatively be made of an electrically conducting material such as aluminum. Also, although the spring 38 was used as the elastic body, rubber or the like may be used for the elastic body and the detecting part may be made using a scale which can detect compression of this rubber. Further, the elastic body may be made of pressure sensitive rubber and the compressing pressure may be taken out as an electrical signal.

An inner gear 46 is screw-fixed with bolts to the rotating side casing 22, and a tooth part of the inner gear 46 formed on the inner side thereof is made of reinforced plastic, for example, polyacetal resin. The outer side part is a metal casing and covers the outer periphery so as to strengthen the tooth part.

The reference numeral 47 denotes a shaft cylinder formed integrally with the inner gear 46. A bearing 48 is interposed between the shaft cylinder 47 and the sleeve 34 so that the turning plate 35 can turn smoothly.

The motor 49 is housed in the fixed side casing 21, and a belt 51 is fitted to the output shaft 50 of the motor 49. The belt 51 is connected to a first pulley 52. This first pulley 52 is rotatably mounted on the fixed side casing 21 through a bearing 53. A second pulley 56 is provided coaxially with the first pulley 52 through a one way clutch 54 and a bearing 55 therebetween. Power from the first pulley 52 is transmitted to the second pulley 56 in one direction only. A gear 57 is formed on the second pulley 56, and this gear 57 and the inner gear 46 engage with each other and rotate the rotating side casing 22 with the driving force of the motor 49. The one way clutch 54 is provided to make the driving force from the motor 49 and the human driving force independent. That is, it is provided so that, for example, it does not happen that, when the bicycle is being pushed along by hand, the motor 49 rotates together with the rear wheel 11 to place an excessive burden on the user by dynamoelectric braking.

In this kind of bicycle, the motor 49, the output shaft 50, the belt 51, the first pulley 52, the bearing 53, the one way clutch 54, the bearing 55, the second pulley 56 and the gear 57 are collectively called the electric drive system.

The reference numeral 58 denotes a brake arm which rotates together with the container 33 of the gearbox 25. The brake arm 58 rotates inside a brake case 59 together with the rear wheel 11. By a brake shoe 60 disposed inside the brake case 59 being spread by means of a brake lever (not shown) mounted on the handlebars 7, the brake shoe 60 makes pressing contact with the brake arm 58 and brakes the rotation of the rear wheel 11.

The reference numeral 61 denotes a tensioning pulley which can adjust the tension of the belt 51 connecting the motor 49 and the first pulley 52 by pressing thereon. This tensioning pulley 61 is made up of a roller 62 and a base 63, and the pressing force exerted on the belt 51 by the roller 62 is adjusted using a long hole 64 through which a screw fixing the base 63 passes.

Figure 2:
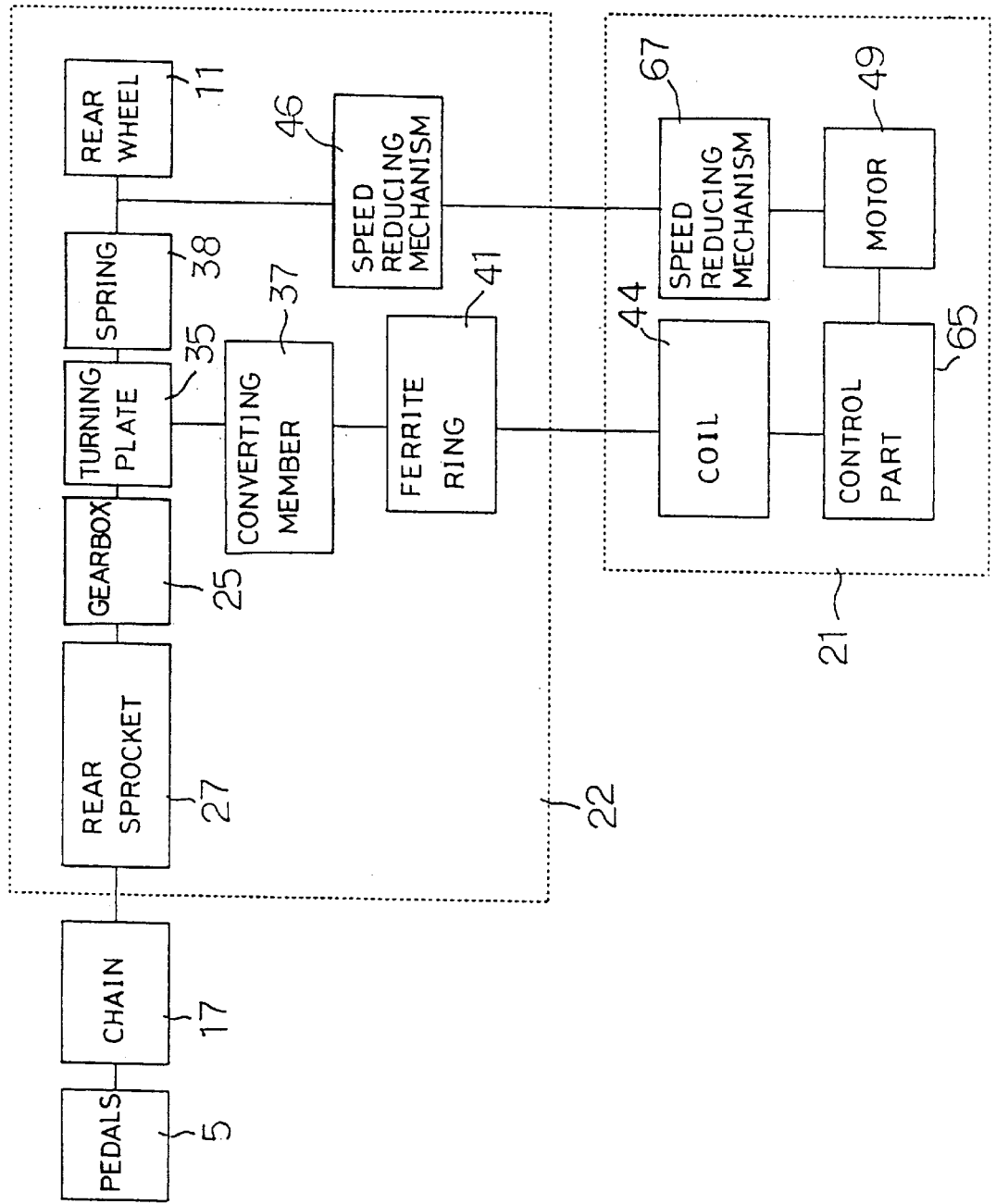
FIG. 2 is a block diagram of a power system of the first preferred embodiment.

Next, this construction will be described with reference to FIG. 2 in conjunction with FIG. 6, which is a block diagram of the overall power system.

First, in the human drive system, human driving force applied to the pedals 5 is transmitted to the rear sprocket 27 by the front sprocket 16 and the chain 17 and, after being changed in speed by the gearbox 25, rotates the rear wheel 11 through the turning plate 35 and the spring 38. Next, in the electric drive system, the amount of compression of the spring 38, i.e. the amount of turn of the turning plate 35 relative to the rotating side casing 22, is converted by the converting rod 37 into an amount of movement of the ferrite ring 41 in the axle 29 direction. This movement of the ferrite ring 41 is converted into change in inductance of the coil 44 and is inputted into control part 65 as an electrical signal.

The control part 65 is made up of an electronic circuit board having a microcomputer, a heat radiating plate and switching elements and the like, and is housed inside the fixed side casing 21. The control part 65 inputs the signal from the coil 44 and outputs a driving signal which drives the motor 49 on the basis of this. The output of the motor 49 is reduced in speed by a speed reducing mechanism 67 comprising the first pulley 52 and the second pulley 56 and the rear wheel 11 rotates. Here, from the rear sprocket 27 to the inner gear 46 and the rear wheel 11, the converting rod 37 and the ferrite ring 41 are mounted on the rotating side casing 22. The control part 65, the coil 44, the motor 49 and the speed reducing mechanism 67 are mounted on the fixed side casing 21.

An electric drive system used in the first preferred embodiment will now be described. The upper right graph in FIG. 1 shows the characteristic of the driving force (added auxiliary driving force) of the electric drive system, the horizontal axis showing traveling speed and the vertical axis showing output torque (the amount of the electric driving force transmitted to the driving wheel). In this preferred embodiment, an electric drive system having this kind of driving force characteristic was used. This kind of driving force characteristic is a predetermined capability of the electric drive system itself, and this capability is determined by factors such as the number of windings, the rotor diameter and the number of poles of the motor. With respect to the driving force characteristic of this electric drive system, the maximum output torque is 450 kg·cm when the speed is 0 km/h. As the rotation of the motor starts and the speed increases the maximum output torque decreases. When the speed reaches 15 km/h, the motor rotates at that speed but there ceases to be any output torque. That is, at this speed and above, there is no output torque auxiliarily applied to the driving wheel.

For example, in this electric drive system, if auxiliary drive at a torque of 300 kg·cm is called for when the speed is 0 km/h, the torque can be amply provided. However, if an output at a torque of 300 kg·cm is called for when the speed is 13 km/h, an output of only 100 kg·cm can actually be made even if the instruction from the control circuit is 300 kg·cm because, with this electric drive system, it is possible to output a maximum of only 100 kg·cm when the speed is 13 km/h.

Similarly it becomes impossible to output a torque of over 150 kg·cm when the speed becomes 12 km/h or over, although this torque output is possible at speeds lower than 12 km/h. As the speed increases, the torque that can be outputted decreases, and the output torque becomes 0 at the speed 15 km/h.

The operation of the control part 65 will now be described on the basis of FIG. 1.

First, the assist ratio of the electric driving force to the human driving force will be explained. The assist ratio is predetermined and stored inside the control circuit of the control part 65, and in this preferred embodiment the ratio of the electric driving force to the human driving force is set to be 1:1. In the lower left graph of FIG. 1, the horizontal axis shows human driving force and the vertical axis shows set assist ratio. In the case of this preferred embodiment, when the human driving force is for example 150 kg·cm, an electric driving force of 150 kg·cm is called for because the set assist ratio is 1.0. This will be explained using FIG. 1. The upper left graph of FIG. 1 shows human driving force on the horizontal axis and electric driving force on the vertical axis and is a graph of electric driving force called for with respect to detected human driving force. For example, when an electric driving force providing a torque of 150 kg·cm is called for, output at a torque of 150 kg·cm is possible at speeds from 0 to 12 km/h if an electric drive system having the torque characteristic shown in the upper right graph of FIG. 1 is used. However, even if output of a torque of 150 kg·cm is called for, the capability of the electric drive system is such that it is not possible to output at a torque greater than this when the speed is 12 km/h or over. Namely, at speeds above 12 km/h, at most the maximum torque determined by the capability of the electric drive system can be outputted. Consequently, as a result of using this electric drive system, when traveling speed is plotted on the horizontal axis and actual assist ratio is plotted on the vertical axis, the assist ratio is 1 up to the speed 12 km/h but, at speeds above that, the ratio gradually decreases according to the characteristic of the electric drive system, and eventually at 15 km/h the torque output becomes zero, as shown by the line B in the lower right graph of FIG. 1.

A case where the torque resulting from the human driving force is 100 kg·cm will now be explained. Because the predetermined assist ratio is 1.0, an electric driving force also of 100 kg·cm is called for, as can also be seen from the upper left graph of FIG. 1. Accordingly, when an electric drive system having the characteristic shown in the upper right graph of FIG. 1 is used, an output of 100 kg·cm is possible when the speed is from 0 to 13 km/h. However, even if output of a torque of 100 kg·cm is called for, the capability of the electric drive system is such that it is not possible to output at a torque greater than this at speeds over 13 km/h. Namely, at speeds above 13 km/h, at most the maximum torque determined by the capability of the electric drive system can be outputted. Consequently, as a result of using this electric drive system, when traveling speed is plotted on the horizontal axis and actual assist ratio is plotted on the vertical axis, the assist ratio is 1 up to the speed 13 km/h but, at speeds above that, the ratio gradually decreases according to the characteristic of the electric drive system, and eventually at 15 km/h the torque output becomes zero, as shown by the line A in the lower right graph of FIG. 1.

Similarly, considering the cases when the human driving force is 200 kg·cm and 250 kg·cm, the required electric driving force is 200 kg·cm or 250 kg·cm. When this electric drive system having the characteristic shown in the upper right graph of FIG. 1 is used, the characteristic of the electric drive system is such that the actual assist ratio is 1 at speeds from 0 to 11 km/h if the human driving force is 200 kg·cm, and at speeds from 0 to 8 km/h if the human driving force is 250 kg·cm. At speeds above 11 km/h and 8 km/h respectively, the output torque decreases according to the torque characteristic of the electric drive system and the actual assist ratio of the output torque becomes as shown by the lines C and D in the lower right graph of FIG. 1.

The line H in the lower right graph of FIG. 1 shows a change in assist ratio with respect to speed stipulated for ensuring safety during high speed traveling. When an electric drive system having this characteristic is used, the actual assist ratio of the output is kept inside the range of this line H. Thus, using an electric drive system whose torque characteristic is such that it outputs no auxiliary driving force at speeds over 15 km/h, the actually outputted assist ratio does not exceed the line H, i.e. the stipulated assist ratio in FIG. 1 even if the preset assist ratio is 1, so that it is possible to execute speed control safely without providing a speed sensor for carrying out speed control per se.

A second preferred embodiment of the invention will now be described with reference to FIG. 8.

Figure 8:
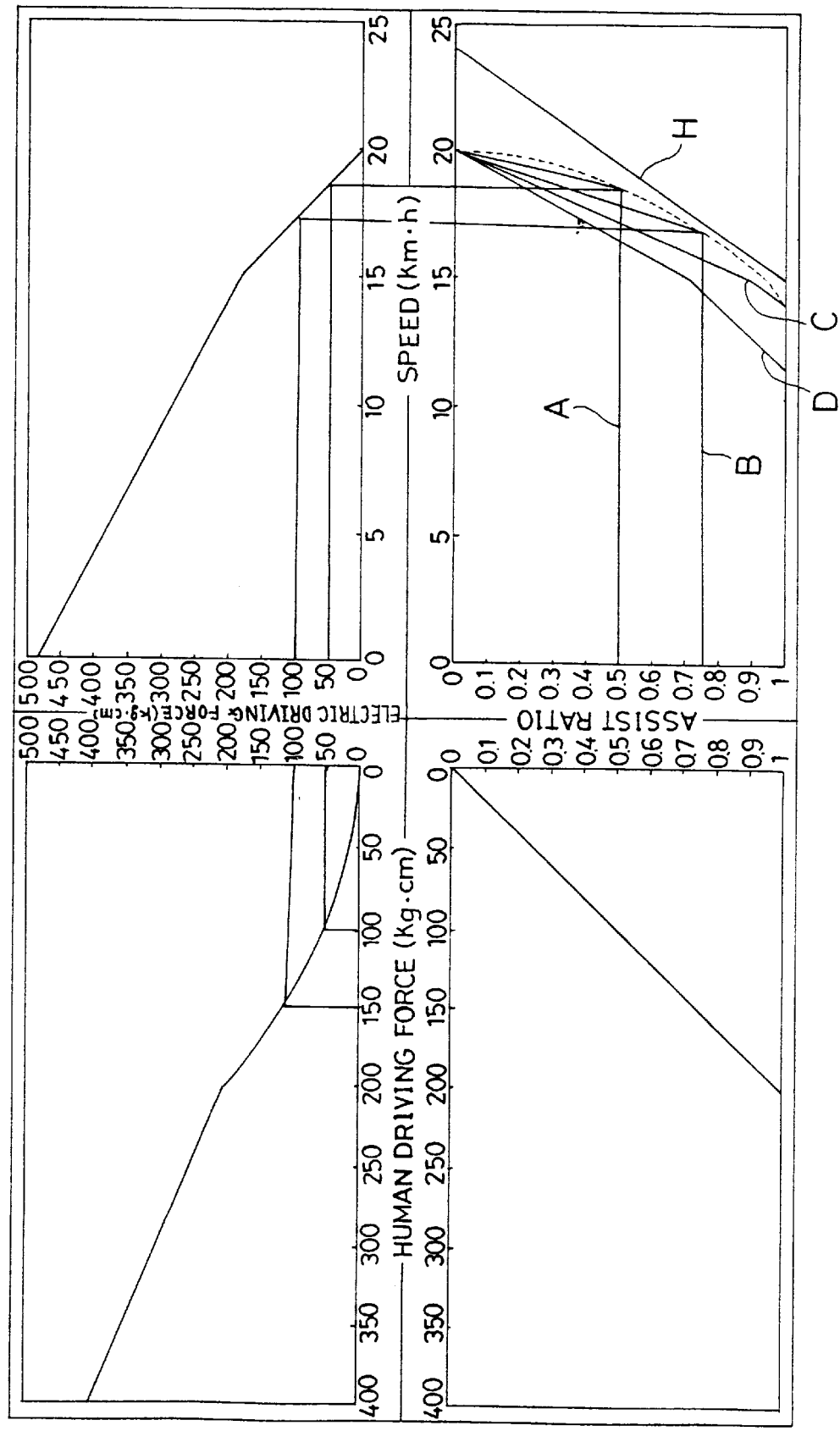
FIG. 8 is a set of graphs showing actual output torque assist ratio obtained from set assist ratio and electric drive system driving force characteristics of a second preferred embodiment of the invention.

As in the first preferred embodiment, an output ratio of electric driving force to human driving force, or assist ratio, for ensuring safety during high speed traveling has been determined to be 1.0 at speeds up to 15 km/h and to gradually decrease linearly from 1.0 to 0 at speeds above 15 km/h, as shown by H in the lower right graph of FIG. 8.

A motor which outputs torque only at speeds below 24 km/h, which is the speed at which the regulated assist ratio becomes 0, for example, below 20 km/h is used as the motor 49 in the electric drive system in this case, as shown in the upper right graph of FIG. 8. The output torque of the electric drive system is the output when the auxiliary driving force is outputted from the motor 49 and power is finally transmitted to the rear wheel 11.

In this second preferred embodiment, the output torque from the electric drive system is set as shown in the lower left graph of FIG. 8. That is, the assist ratio is set so that, when the human driving force is 200 kg·cm or less, the assist ratio decreases linearly from 1 until it reaches zero. This suppresses battery consumption and makes the battery last longer by reducing the assist ratio of the electric driving force in the case of small human driving force and thereby keeping the electric driving force down when it is not needed so much, while providing ample electric driving force in the case of large human driving force. The curve of the electric driving force required in this setting of the assist ratio is shown in the upper left graph of FIG. 8. Until the human driving force reaches 200 kg·cm, the required electric driving force rises gradually in a curve, and above 200 kg·cm it rises linearly because the same amount of electric driving force as the human driving force is called for. Here, the torque characteristic of the electric drive system will now be compared to see how much torque is actually outputted. When the human driving force is for example 100 kg·cm, an electric driving force of 50 kg·cm is called for based on the set assist ratio. At this time, a torque of 50 kg·cm is outputted as the electric driving force at speeds from 0 to 18 km/h. However, because a torque above 50 kg·cm cannot be outputted at speeds above about 18 km/h, the assist ratio with respect to traveling speed, as shown by the line A in the lower right graph of FIG. 8, is 1 at speeds of from 0 to 18 km/h and gradually decreases at speeds over 18 km/h due to the output characteristic of the electric drive system.

When the human power torque is 150 kg·cm, an electric drive system torque of 112.5 kg·cm is called for based on the set assist ratio. However, the actual assist ratio is as shown by the line B in the lower right graph of FIG. 8 because the torque characteristic of the electric drive system is such that when the speed is over 17 km/h a torque greater than 112.5 kg·cm cannot be outputted. Similarly, when the human driving force is 200 kg·cm, the actual assist ratio is as shown by the line C. When the human driving force is 250 kg·cm, the actual assist ratio is as shown by the line D. When the maximum assist ratio at every speed is calculated from these results and plotted, the kind of curve shown with a dotted line is obtained. This curve does not cross the straight line H.

Thus, control is possible while maintaining the assist ratio to be less than a stipulated assist ratio without providing a speed sensor for carrying out control based on speed because an electric drive system whose torque characteristic is such that it outputs no torque at speeds over 24 km/h was used, for example, an electric drive system which outputs no torque at speeds over 20 km/h was used, and also the assist ratio was made to increase as the human driving force increases. Therefore, it is possible to provide maximum power assistance while ensuring safety at high speeds.

A third preferred embodiment of the invention will now be described with reference to FIG. 9.

Figure 9:
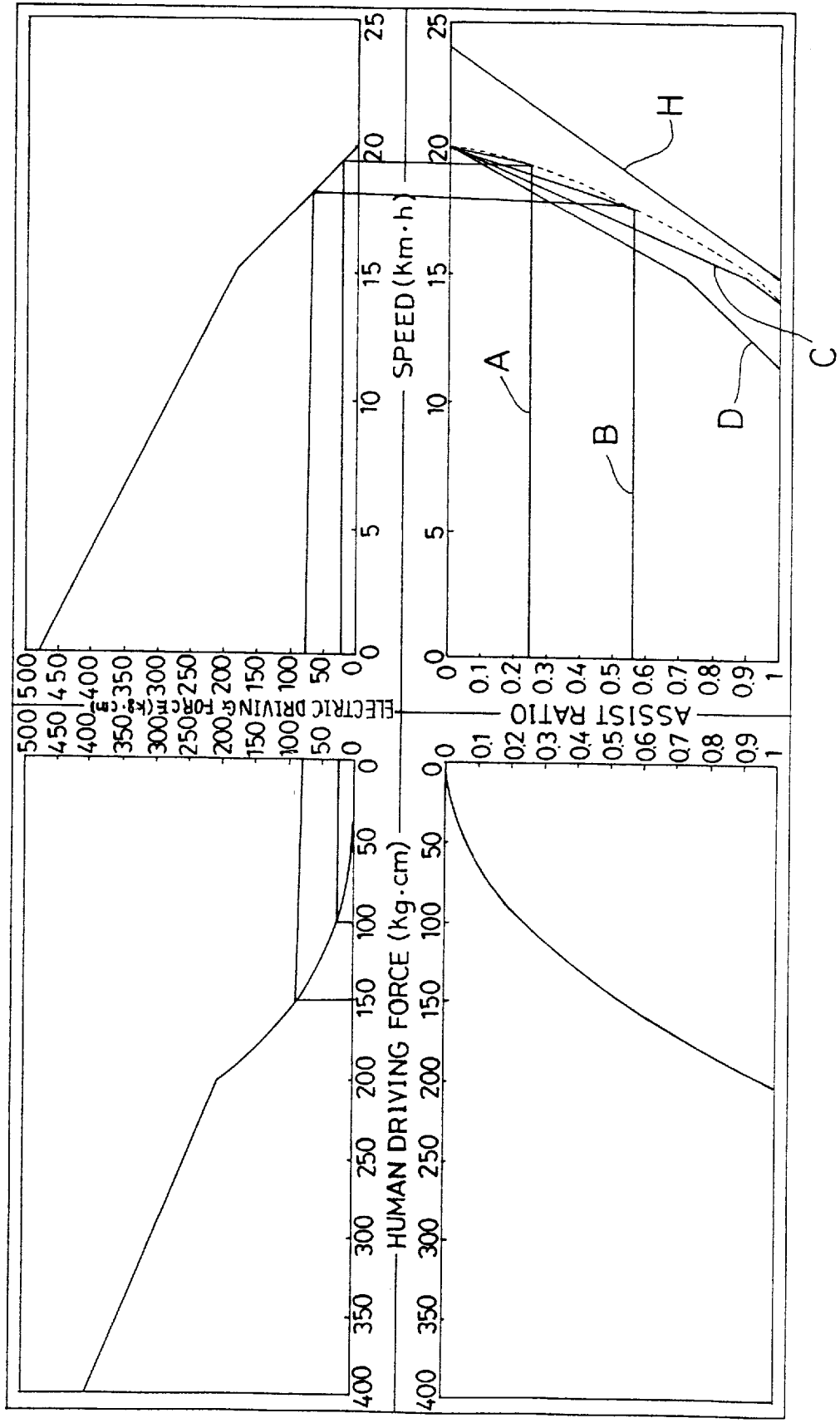
FIG. 9 is a set of graphs showing actual output torque assist ratio obtained from set assist ratio and electric drive system driving force characteristics of a third preferred embodiment of the invention.

As in the first and second preferred embodiments, the output ratio of electric driving force to human driving force, or the assist ratio, for ensuring safety at high speeds, is 1.0 at speeds up to 15 km/h and is allowed to gradually decrease linearly from 1.0 to 0 at speeds above that, as shown by H in the lower right graph of FIG. 9.

As in the second preferred embodiment, a motor which outputs torque only at speeds below 24 km/h, which is the speed at which the assist ratio must become 0, for example, below 20 km/h is used as the motor 49 in the electric drive system in this case. The output torque of the electric drive system is the output when the driving force is outputted from the motor 49 and power is finally transmitted to the rear wheel 11.

In this third preferred embodiment, the output torque of the electric drive system is set as shown in the lower left graph of FIG. 9. That is, when the human driving force is under 200 kg·cm, the assist ratio forms a second-order curve from 1 to 0 and is set so that, as the value of the human driving force increases, the rate of change in the assist ratio at that point on the curve increases. This suppresses battery consumption and makes the battery last longer by providing a small electric driving force in the case of small human driving force and thereby keeping the electric driving force down when it is not needed so much, while providing ample electric driving force in the case of large human driving force.

The output of the electric drive system of this case will now be examined by taking into account the torque characteristic of the electric drive system. When the human power torque is for example 100 kg·cm, the set assist ratio is about 0.25 and an electric driving force output of about 25 kg·cm is required. However, since the characteristic of the electric drive system is such that at speeds above 19 km/h it is not possible to output a torque over 25 kg·cm, the actual assist ratio is smaller than the set assist ratio and becomes as shown by the line A in the lower right graph of FIG. 9. When the human power torque is 150 kg·cm, the set assist ratio is 0.56 and a torque of 84 kg·cm from the electric drive system is required. However, since the characteristic of the electric drive system is such that at speeds above 17 km/h it is not possible to output a torque over 84 kg·cm, the actual assist ratio is as shown by the line B based on the lower right graph. Similarly, when the human power torque is 200 kg·cm, the assist ratio is as shown by the line C. When it is 250 kg·cm, the assist ratio is as shown by the line D. When the maximum assist ratio at every speed is calculated from these results and plotted, the kind of curve shown by a dotted line is obtained. This curve does not cross the straight line H.

Thus, control is possible while maintaining the assist ratio to be less than a stipulated assist ratio without providing a speed sensor for carrying out control based on speed, and it is possible to provide power assistance with safety at high speeds ensured because an electric drive system whose torque characteristic is such that it outputs no torque at speeds over 24 km/h, for example, an electric drive system which outputs no torque at speeds over 20 km/h was used, and also at low torques the assist ratio was allowed to increase as the human driving force increases.

A fourth preferred embodiment of the invention will now be described with reference to FIG. 10.

Figure 10:
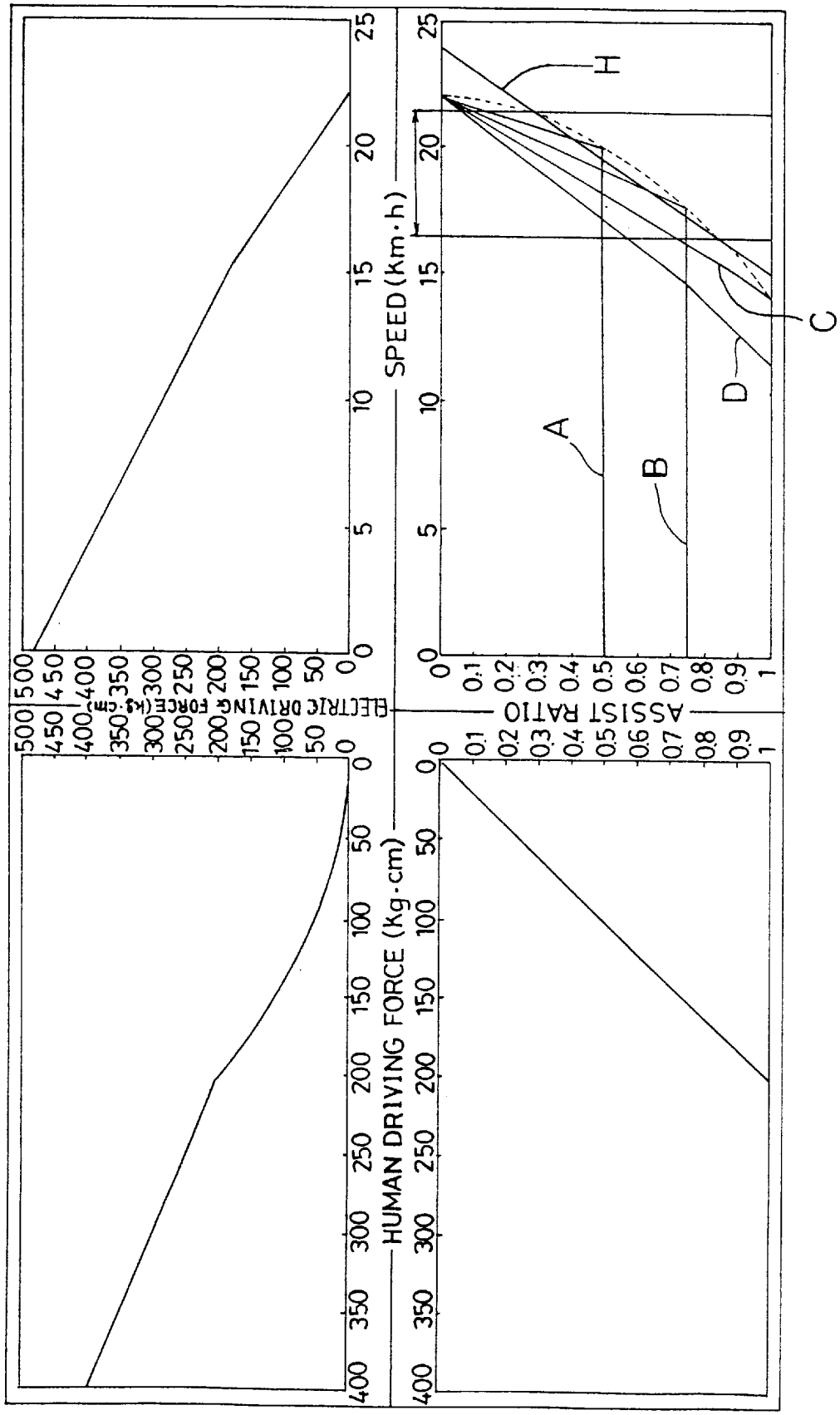
FIG. 10 is a set of graphs showing actual output torque assist ratio obtained from set assist ratio and electric drive system driving force characteristics for obtaining beforehand a fourth preferred embodiment of the invention.

The assist ratio with respect to traveling speed for ensuring safety is shown by the line H in the lower right graph of FIG. 10; up to 15 km/h this assist ratio is 1.0, and between 15 km/h and 24 km/h it decreases linearly from 1.0 to 0.

For example, the following is a case where an electric drive system having a torque characteristic of the kind shown in the upper right graph of FIG. 10 is used and, as shown in the lower left graph of FIG. 10, the assist ratio is set in the same way as in the second preferred embodiment.

As in the preferred embodiments described above, for cases where the human power torque is 100, 150, 200 and 250 kg·cm, the respective actual assist ratios A, B, C and D are as shown in the lower right graph. When the maximum assist ratio at every speed is calculated from these results and plotted, the kind of curve shown with a dotted line is obtained. In this case, at speeds between 17 km/h and 21 km/h the maximum assist ratio exceeds the ratio stipulated by the range of the line H in the lower right graph of FIG. 10.

Figure 11:
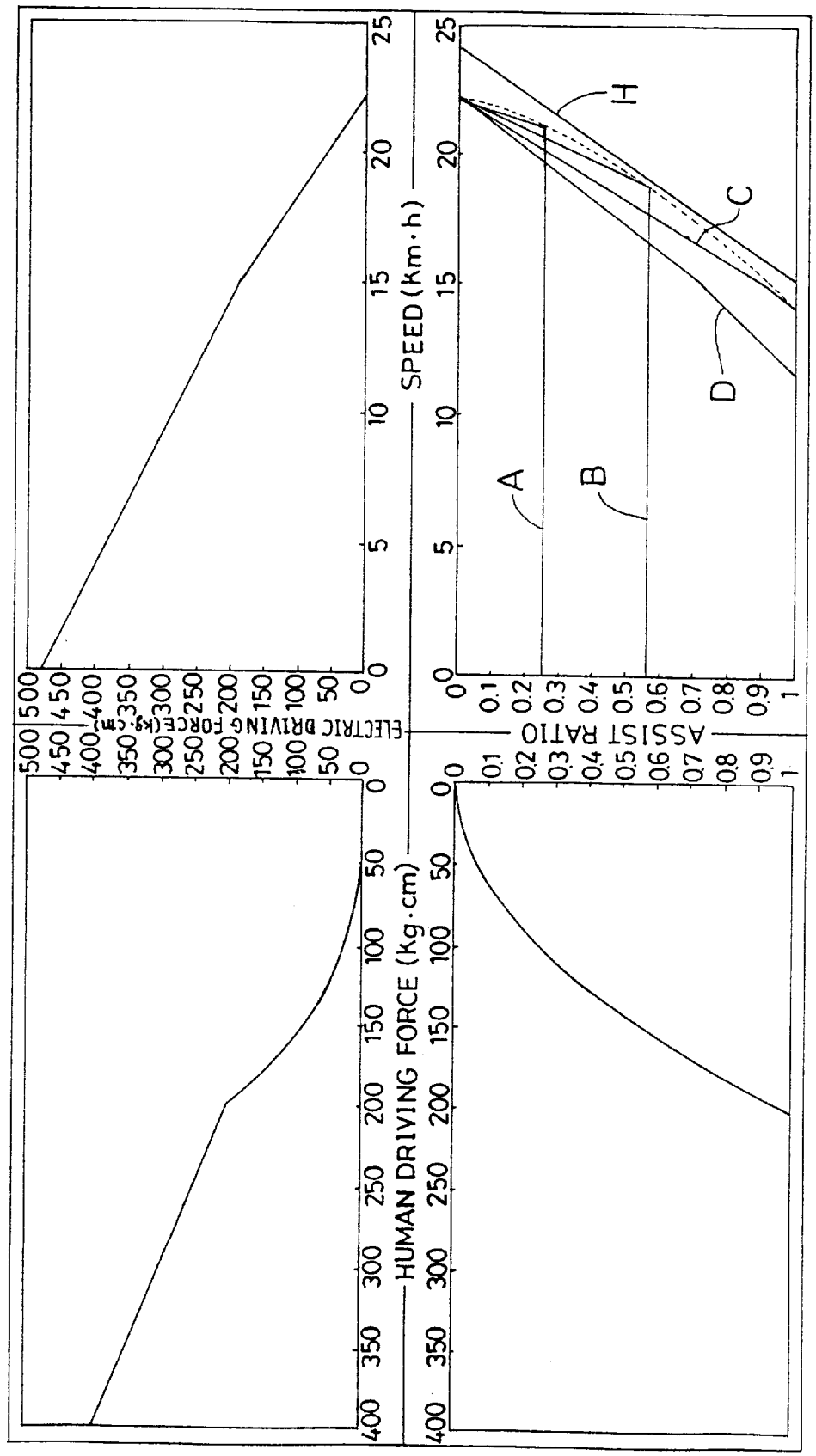
FIG. 11 is a set of graphs showing actual output torque assist ratio obtained from set assist ratio and electric drive system driving force characteristics of the fourth preferred embodiment of the invention.

Therefore, in this fourth preferred embodiment, as shown in the lower left graph of FIG. 11, the preset assist ratio is set to describe a second-order curve like that of the third preferred embodiment and the assist ratio is set to gradually increase up to 200 kg·cm. As a result, as shown in the lower right graph of FIG. 11, when the human power torque is 100, 150, 200 and 250 kg·cm, the respective actual assist ratios are as shown by the lines A, B, C and D, and the maximum assist ratio does not exceed the predetermined value H.

In this way, even if the output torque characteristic of the electric drive system changes, it is possible to control the actual assist ratio without using a speed sensor by changing the preset assist ratio, so that the torque output does not exceed a safe range.

In the third and fourth preferred embodiments described above, the preset assist ratios were set to describe second-order curves and the rate of change of the assist ratio was allowed to increase as the human power torque increases. Alternatively, however, the rate of change of the assist ratio can be made large when the human power torque is small and this rate of change can be made to decrease as the human power torque increases.

In the first through fourth preferred embodiments, a plurality of different types of set assist ratios may be stored in the control circuit so that these can be changed over at the will of the user by means of a switch. Also, set assist ratios may be automatically changed over so that the assist ratio is made large at times such as starting and uphill traveling when a large electric driving force is required.

Figure 12:
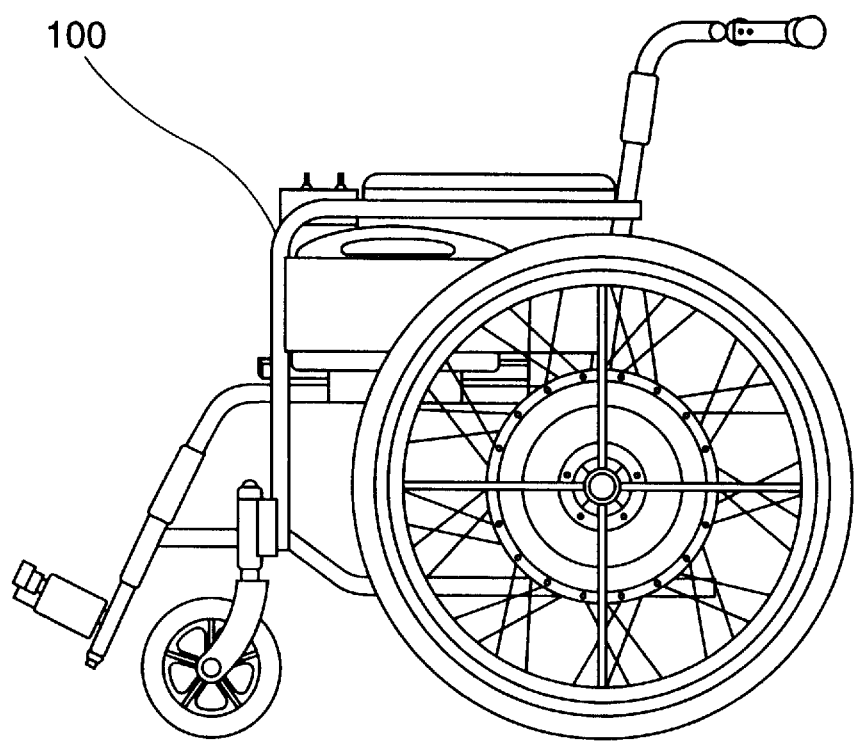
FIG. 12 is a view of a wheelchair main body.

FIG. 12 shows a wheelchair main body 100 as the vehicle main body.

What is claimed is:

1. An electrically assisted vehicle comprising:
   a vehicle main body having a driving wheel driven by a human drive system and an electric drive system;
   the human drive system having a driving force applying part to which a human driving force for driving the driving wheel and a torque detecting part for detecting the human driving force applied to the driving force applying part; and
   the electric drive system having a motor for outputting an electric driving force for driving the driving wheel, a control part for controlling the motor and a battery for power supply,
   wherein the motor of said electric drive system has an electric driving force characteristic such that the motor outputs the electric driving force only at speeds lower than a predetermined upper limit value of a safe traveling speed range or a predetermined lower limit value of a dangerous traveling speed range, and
   the control part of said electric drive system controls the motor with a predetermined ratio on the basis of detection results from the torque detecting part of the human drive system.

2. An electrically assisted vehicle according to claim 1, wherein the predetermined ratio is a ratio of the electric driving force to the human driving force and is in a range from 0 to 1.

3. An electrically assisted vehicle according to claim 1, wherein the lower limit value of the dangerous traveling speed range is 24 km/h.

4. An electrically assisted vehicle according to claim 1, wherein the torque detecting part of the human drive system converts an amount of compression of a coil spring in the direction of rotation of the driving wheel into an amount of movement in the axial direction of the driving wheel and detects the amount of movement as an electrical signal by means of an induction coil.

5. An electrically assisted vehicle according to claim 1, wherein the vehicle main body is a bicycle main body.

6. An electrically assisted vehicle according to claim 1, wherein the vehicle main body is a wheelchair main body.

7. An electrically assisted vehicle according to claim 1, wherein the upper limit value of the safe traveling speed range is 15 km/h.

8. An electrically assisted vehicle comprising:
   a vehicle main body having a driving wheel driven by a human drive system and an electric drive system;
   the human drive system having a driving force applying part to which a human driving force for driving the driving wheel is applied and a torque detecting part for detecting the human driving force applied to the driving force applying part; and
   the electric drive system having a motor for outputting an electric driving force for driving the driving wheel, a control part for controlling the motor and a battery for power supply,
   wherein the control part of the electric drive system controls the motor on the basis of detection results from the torque detecting part of the human drive system, and
   a ratio of the electric driving force to the human driving force changes linearly in a range from 0 to 1 if the human driving force is below a predetermined value, and is constant if the human driving force is above the predetermined value.

9. An electrically assisted vehicle according to claim 8, wherein the predetermined value of the human driving force is 200 kg·cm.

10. An electrically assisted vehicle comprising:
    a vehicle main body having a driving wheel driven by a human drive system and an electric drive system;
    the human drive system having a driving force applying part to which a human driving force for driving the driving wheel is applied and a torque detecting part detecting part for detecting the human driving force applied to the driving force applying part; and the electric drive system having a motor for outputting an electric driving force for driving the driving wheel, a control part for controlling the motor and a battery for power supply, wherein the control part of the electric drive system controls the motor on the basis of detection results from the torque detecting part of the human drive system, and a ratio of the electric driving force to the human driving force changes curvilinearly in a range from 0 to 1 if the human driving force is below a predetermined value, and is constant if the human driving force is above the predetermined value.

11. An electrically assisted vehicle according to claim 10, wherein the predetermined value of the human driving force is 200 kg·cm.

12. An electrically assisted vehicle comprising:

a vehicle main body having a driving wheel driven by a human drive system and an electric drive system;

said human drive system having a driving force applying part for acceptance of a human driving force for driving said driving wheel and a torque detecting part for detecting said human driving force applied to said driving force applying part; and said electric drive system having a motor for outputting an electric driving force for driving said driving wheel and a control part for controlling said motor, wherein said motor of said electric drive system has an electric driving force characteristic independent of speed detection such that said motor outputs said electric driving force only at speeds lower than a predetermined speed, and said control part of said electric drive system controls said motor with a predetermined ratio on the basis of detection results from said torque detecting part of said human drive system.

13. An electrically assisted vehicle comprising:

a main body having a driven wheel;

a manual drive system connected to said driven wheel whereby a human can transmit a manual force through said manual drive system to drive said driven wheel;

a manual force detector connected to said manual drive system and transmitting an output signal based on a magnitude of said manual force;

a motor-driven mechanical drive connected to said driven wheel, whereby said motor transmits a mechanical force through said mechanical drive to drive said driven wheel;

wherein said motor of said motor-driven mechanical drive system has a driving force characteristic independent of speed detection such that said motor outputs said driving force only at speeds lower than a predetermined speed, and a controller connected to said motor to control said mechanical force only when a speed of said electrically assisted vehicle is below a predetermined speed; and said controller varying said mechanical force transmitted by said motor to said driven wheel based on said output signal received from said manual force detector.

* * * * *